United States Patent [19]

Fujinami et al.

[11] 4,393,271

[45] Jul. 12, 1983

[54] METHOD FOR SELECTIVELY DISPLAYING A PLURALITY OF INFORMATION

[75] Inventors: Hiroshi Fujinami, Bloomfield Hills, Mich.; Takashi Yamada, Anjo, Japan

[73] Assignee: Nippondenso Co., Ltd., Kariya, Japan

[21] Appl. No.: 181,903

[22] Filed: Aug. 27, 1980

Related U.S. Application Data

[63] Continuation of Ser. No. 3,935, Jan. 16, 1979.

[51] Int. Cl.³ .............................................. G10L 1/00
[52] U.S. Cl. .............................. 179/1 SM; 179/1 VE; 364/467
[58] Field of Search ............... 179/1 VC, 1 SB, 1 SC, 179/1 SD, 1 VE; 340/148; 364/424, 442, 467

[56] References Cited

U.S. PATENT DOCUMENTS

| | | | |
|---|---|---|---|
| 3,356,836 | 12/1967 | Stenby | 179/1 VC |
| 3,742,451 | 6/1973 | Graham et al. | 179/1 SB |
| 3,870,818 | 3/1975 | Barton et al. | 179/1 SM |
| 4,087,630 | 5/1978 | Browning et al. | 179/1 SD |
| 4,156,868 | 5/1979 | Levinson | 179/1 SD |
| 4,205,388 | 5/1980 | Stener | 364/467 |
| 4,264,956 | 4/1981 | Delaney | 364/467 |

OTHER PUBLICATIONS

T. Martin, "One Way to Talk to Computers", IEEE Spectrum, May, 1977, pp. 35–39.

*Primary Examiner*—Emanuel S. Kemeny
*Attorney, Agent, or Firm*—Cushman, Darby & Cushman

[57] ABSTRACT

A method for selectively displaying a plurality of types of data in which a voice command is converted into an electric signal. A vowel pattern in the command is identified by processing the electric signal. Each vowel pattern is preliminarily associated with a type of data so that when a particular vowel pattern is received the associated type of data is displayed.

1 Claim, 11 Drawing Figures

METHOD FOR SELECTIVELY DISPLAYING A PLURALITY OF INFORMATION

This is a continuation of application Ser. No. 3,935 filed Jan. 16, 1979.

BACKGROUND OF THE INVENTION

This invention relates to a voice-selected display method and an apparatus therefor, in which the selective display on a display panel of various data relating to an automobile is controlled by a voiced command.

Usually, in front of the occupant's seat in an automobile, various displays of data such as a speedmeter, a fuel meter, a tachometer and an odometer are mounted. It is not convenient in view of a space for mounting them, to display the information separately. While information such as speed is always necessary for the driver, there is information that is necessary only in a certain limited time when it is called for. Therefore, it is useless to give all the information continually to a driver.

SUMMARY OF THE INVENTION

In view of these problems, an object of this invention is to provide a voice selected display method and an apparatus suitably embodying the method. A voice command is received and the type of data for which it stands is determined. That particular type of data is then displayed until another command is received. In this manner, data is efficiently supplied in a minimum of display space.

DESCRIPTION OF THE PREFERRED EMBODIMENTS

Figure 1:
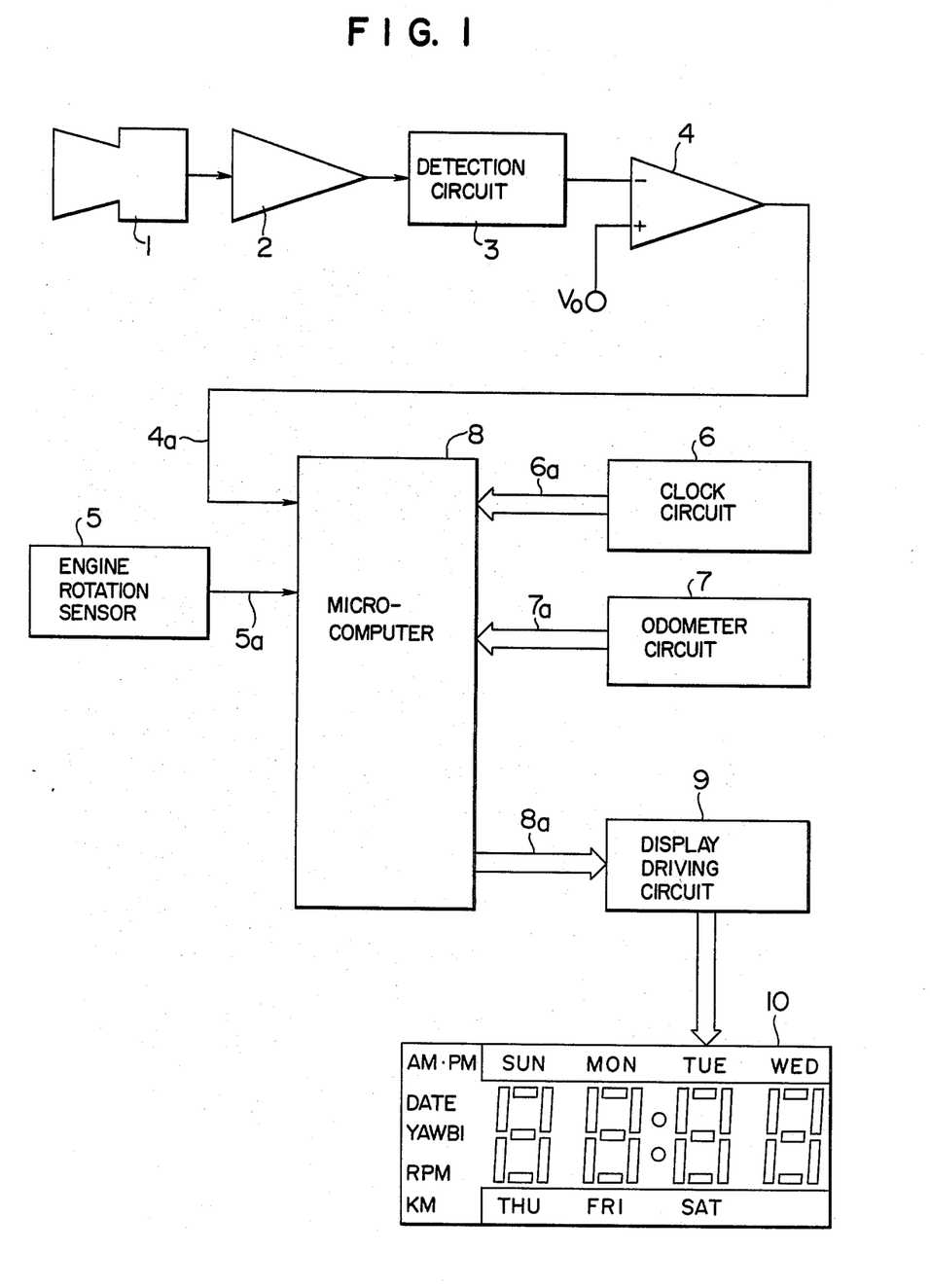
FIG. 1 is a block diagram showing one embodiment of a voice-selected display method and an apparatus therefor according to this invention.

In FIG. 1 showing a whole construction of the invention in a block diagram, data such as time, date, calendar day, number of revolutions of the engine and drive distance are selectively displayed in accordance with a voiced command. The reference numeral 1 designates a directional microphone or a means for converting a voiced command of a driver in a predetermined direction into an electric signal; 2 an amplifier for amplifying the electric signal from the microphone 1; 3 a detection circuit for deriving a rectified waveform signal depending on the voice from the signal amplified by the amplifier 2; 4 a comparator for comparing the rectified waveform signal of the detecting circuit 3 with a reference voltage $V_o$ to detect vowels contained in the voice and generate a number of rectangular waveform signals 4a depending on the number of vowels in the voiced sound; 5 an engine rotation sensor for detecting the number of revolutions of the engine of the automobile and for generating revolution number pulses 5a; 6 a clock circuit continually supplied with power from a car-borne battery for calculating electronically time, date, and calendar day and generating a digital clock signal 6a containing the time, the date and the calendar day signals; and 7 an odometer circuit continually supplied with power from the car-borne battery for calculating electronically a drive distance of the automobile and generating a distance signal 7a in a digital form. The odometer 7, the clock circuit 6 and the engine rotation sensor 5 constitute a means for generating data.

The reference numeral 8 designates a microcomputer for making calculations in accordance with software following preestablished display control programs. It receives information 5a, 6a, and 7a from the engine rotation sensor 5, the clock circuit 6 and the odometer circuit 7 respectively and a rectangular waveform signal 4a from the Comparator 4, detects a voice pattern representing a kind of voice by an interrupt calculation process, discriminates to which one of the voiced commands for selectively displaying the preliminarily established information such as date, calendar day, engine number of revolutions and drive distance belongs to the voice pattern, generates a display signal 8a for instructing a display of each information in response to the above discrimination, supplies the display signal 8a to a display driving circuit 9 to amplify it to thereby control a display of the data on a display panel 10, which displays selectively five kinds of information: time, date, calendar day, number of engine revolutions number and drive distance. The display panel 10 comprises classification characters "AM.PM", "DATE", "YAWBI", "RPM" and "KM", display elements with 4 figures and 7 segments representing a numerical value, a display part consisting of two-points divided elements, and a calendar day display part.

The amplifier 2, the detection circuit 3, the comparator 4 and the microcomputer 8 constitute a calculation processing means, while the display driver circuit 9 and the display panel 10 constitute a display means.

Figure 2:
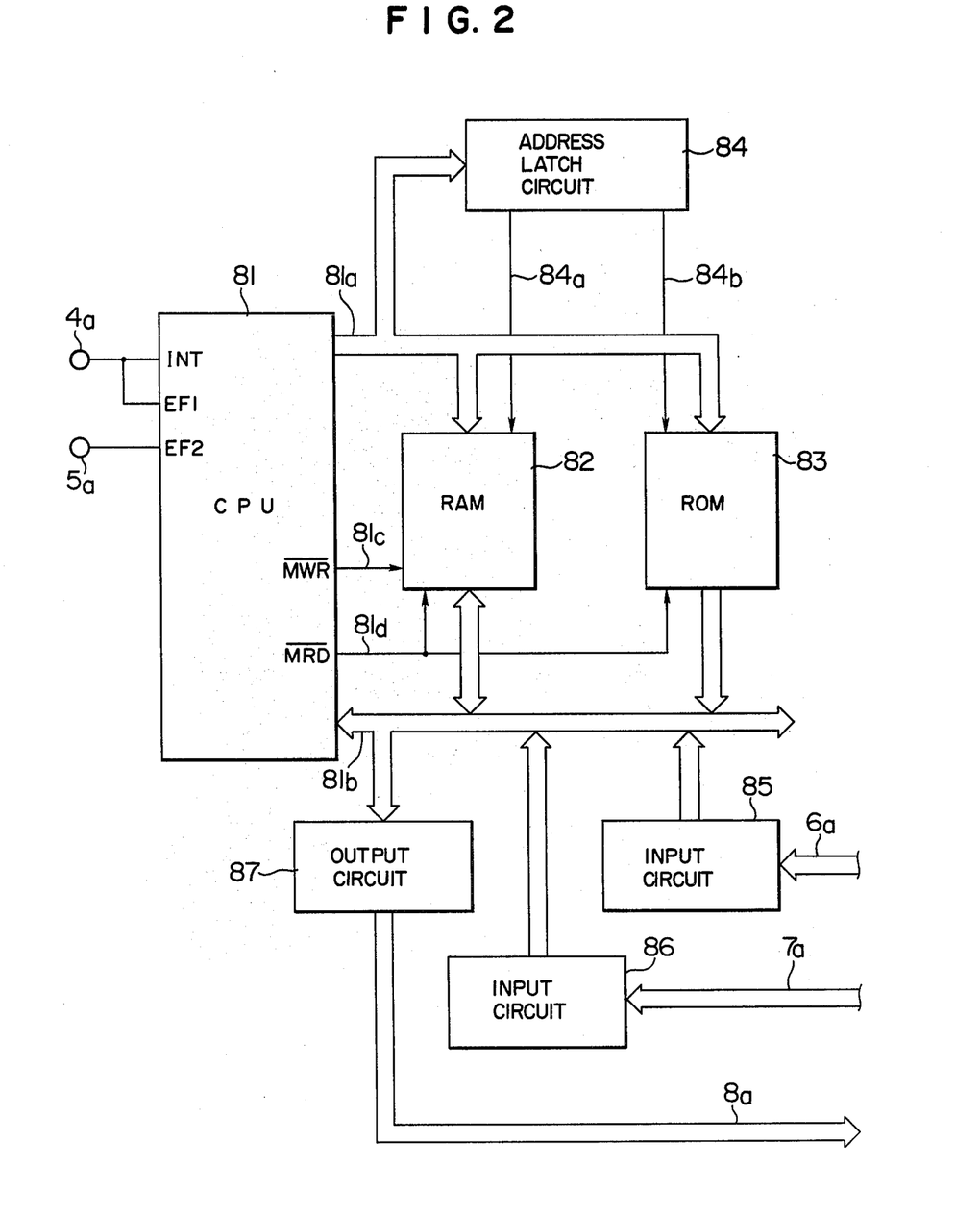
FIG. 2 is a block diagram showing a detailed construction of a microcomputer in FIG. 1.

In FIG. 2, showing a detailed construction of the microcomputer 8 in a block diagram, the reference numeral 81 designates a central processing unit (CPU) of the microcomputer 8, to which a crystal oscillator is connected for generating reference clocks of a few MHz. Synchronized with these clocks, digital processing is performed. CPU 81 is connected through an address bus 81a and a data bus 81b to a random access memory (RAM) 82 for receiving and supplying various information; to a read only memory (ROM) 83, an address latch circuit 84, an input circuit 85 for receiving the clock signal 6a; to an input circuit 86 for receiving the distance signal 7a; and to an output circuit 87 for sending out the display signal 8a. Furthermore, a memory write signal 81c from CPU 81 for instructing data write-in is supplied to RAM 82. A memory read signal 81d for instructing a data read-out is applied to RAM 82 and ROM 83. Calculation command signals 84a and 84b are applied to RAM 82 and ROM 83 from the address latch circuit 84. CPU 81 additionally receives the rectangular waveform signal 4a from the comparator 4 at INT (interrupt accept) and EFI terminals and the revolution pulses 5a synchronized with the rotation of engine at EF2 terminal. Each element constituting each block is made of a semiconductor intergrated circuit using COSMAC product series of RCA Co., Ltd. in USA; i.e. CDP 1802 for CPU 81, CDP 1824 for RAM 82, CDP 1834 for ROM 83, CDP 1859 for the address latch circuit 84 and CDP 1852 for the input circuits 85 and 86 and the output circuit 87.

ROM 83 electrically coupling these circuit elements contains a display control program which stores sequentially, in step unit, calculation processes for discriminating a voiced command and controlling a corresponding display. CPU 81 reads out these calculation processes sequentially, performs it, stores various data during calculation in RAM 82 temporarily, and reads out this data when needed.

Figure 3:
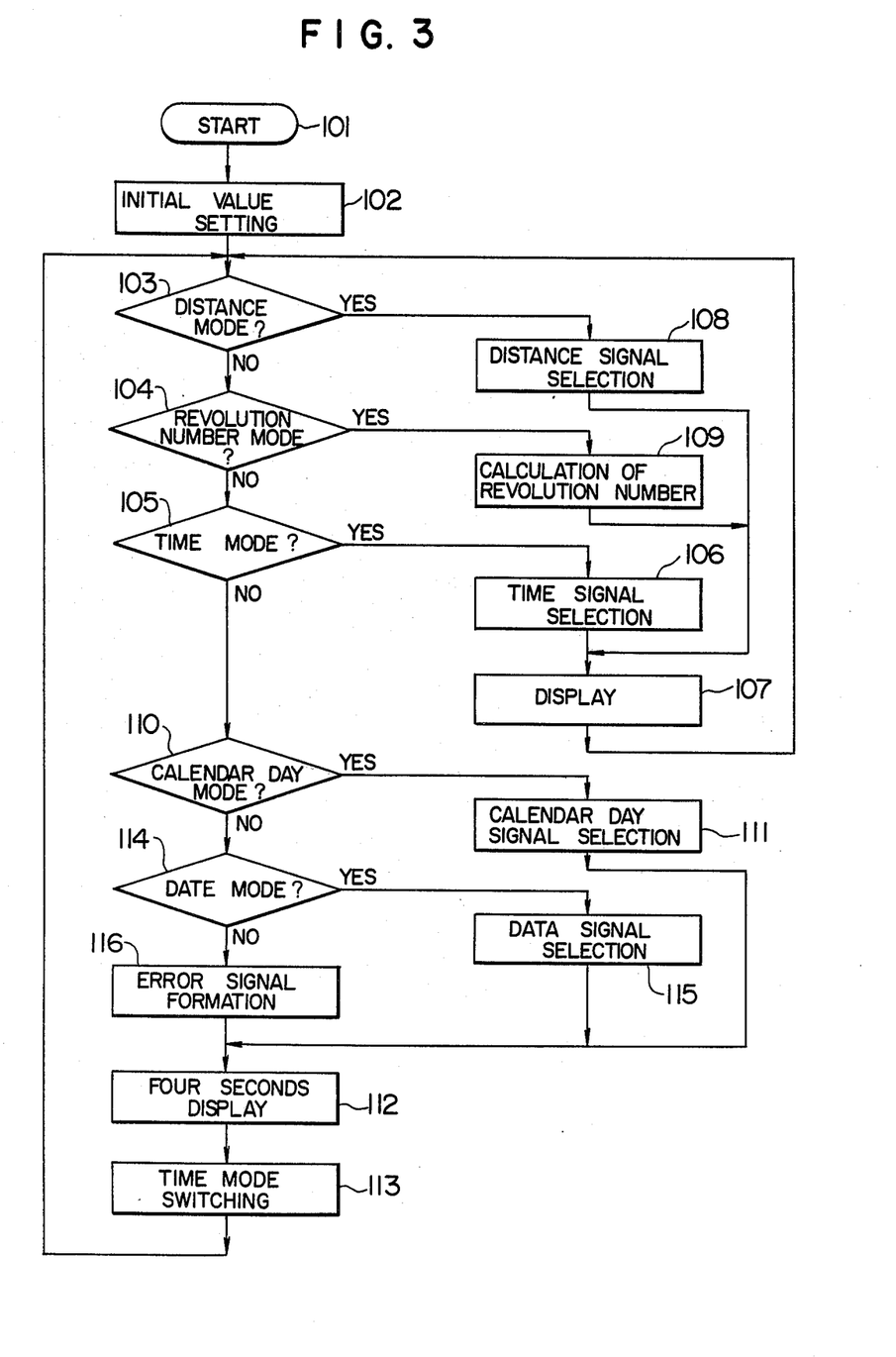
FIG. 3 is a flow chart showing the calculation process for the display control of the microcomputer in FIG. 1.
Figure 4:
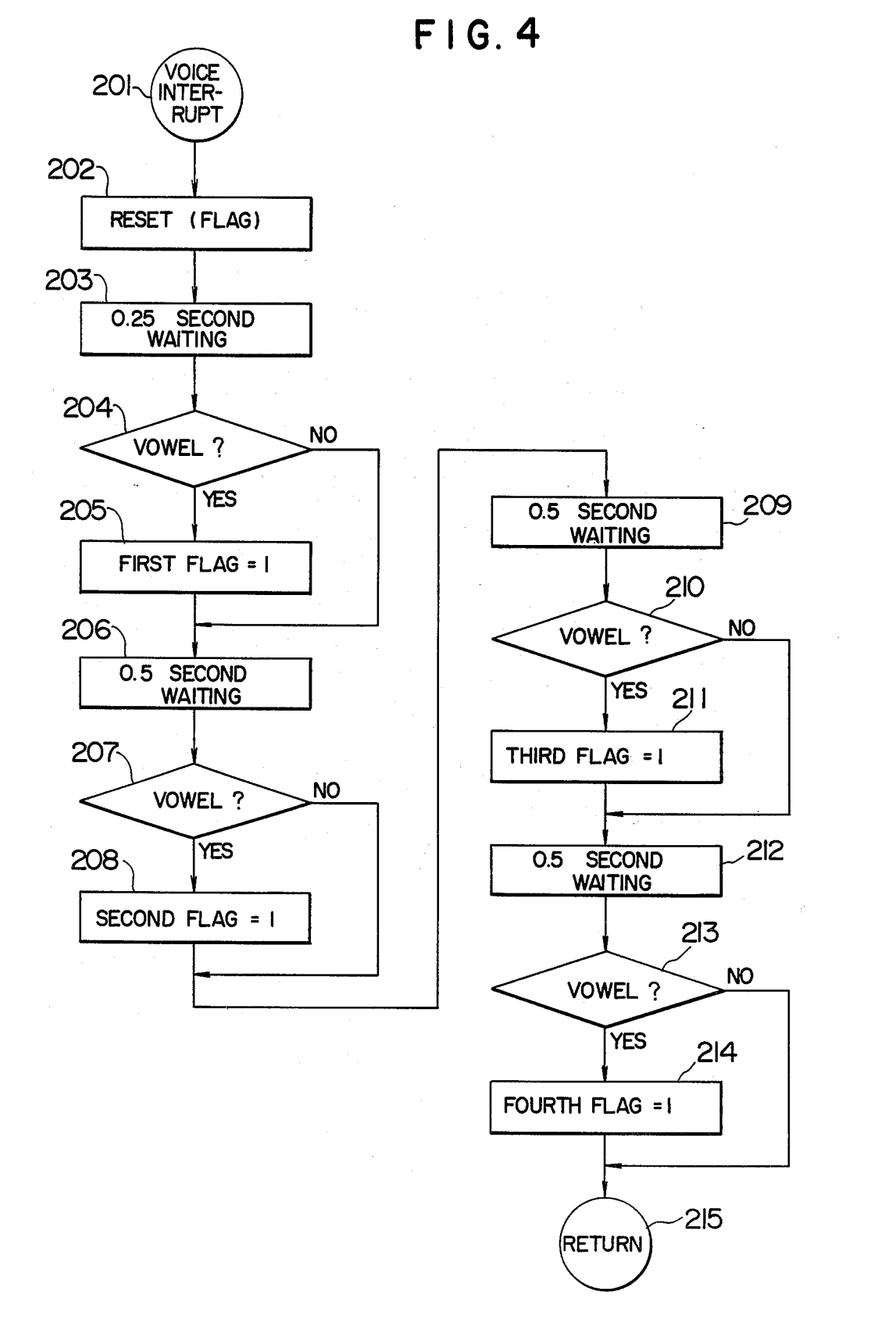
FIG. 4 is a flow chart showing an interrupt calculation process by a voice input of the microcomputer in FIG. 1.

Next, the operation of the above structure will be explained with reference to FIG. 3, FIG. 4 and FIG. 5. FIG. 3 is a flow chart of a calculation, showing calculation steps for controlling a display following a display control program of the microcomputer 8. FIG. 4 is a flow chart of a calculation showing a process of interrupt calculation initiated by a voice input. FIG. 5 shows explanatory views demonstrating each display format depending on a voiced command.

When a voiced command with one vowel "HI" (this means "DATE") is applied to the directional microphone 1, date is displayed on the display panel 10 for 4 seconds by a date signal contained in the clock signal 6a from the clock circuit 6. Thereafter, a time display is reset by the time signal in the clock signal 6a. When a voiced command with two vowels "TA-CHO" is applied to the directional microphone 1, an engine revolution number is displayed on the display panel 10 by revolution pulses 5a from the engine rotation sensor 5. When a voiced command with three vowels "NAN-YAW-BEE" (this means what day of the week) is applied to the directional microphone 1, a calendar day is displayed on the display panel 10 for 4 seconds by the calendar day signal contained in the clock signal 6a from a clock circuit 6. Then, the time display is reset. When a voiced command with four vowels "KYO-LEE-ME-TER" (this means "0-DO-ME-TER") is applied to the directional microphone 1, a drive distance is displayed on the display panel 10 by the distance signal 7a from the odometer circuit 7.

In an automobile having such a voice switched display apparatus as described above, consider a case when a key switch is off. In this case, only the clock circuit 6 and the odometer 7 are continually supplied with power and work. The clock signal 6a containing the time, date and calendar day signals are generated by the clock circuit 6, while the distance signal 7a is generated by the odometer circuit 7. However, the microcomputer not being supplied with power does not operate as yet. Likewise, the display panel 10 is non-operative.

Next, explanation will be made of the operation when the key switch of the automobile is turned on.

In this case, electric circuits of the microcomputer 8 and the display panel 10 are power supplied from a stabilized power supply circuit (not shown) and become operative. Then, the microcomputer 8 begins its calculation process of a display control program from a start step 101 in FIG. 3 and advances to an initial value setting step 102.

In the initial value setting step 102, various states are set at initial values as a necessary provision for starting the calculation process of the microcomputer 8. After a selection mode of first, second, third and fourth flags for storing voice patterns and selecting a display control information is set "0000" in the microcomputer 8, the process advances to a next distance mode discriminating step 103.

In the step 103, whether the selection mode of first, second, third and fourth flags showing a voice pattern coincides with a distance mode "1111" which is one of the preliminarily established standard patterns for selecting the drive distance display is discriminated. Since the selection mode is set "0000" in the initial value setting step 102, the result becomes "NO" and the process advances to a next revolution number mode discriminating step 104.

In the step 104, whether the selection mode of first, second, third and fourth flags coincides with a revolution number mode "1100" which is one of the preliminarily established standard patterns for selecting the revolution number display. However, since the selection mode is set "0000" in the initial step 102, the result of judge becomes "NO", and the process advances to the next time mode discriminating step 105.

In the step 105, whether the selection mode of first, second, third and fourth flags coincides with a time mode "0000" which is one of the preliminarily established standard patterns for selecting the time display is discriminated. Since the selection mode is set "0000" in the initial step 102, the result of the judgment becomes "YES," and the process advances to a time signal selection step 106.

In the time signal selection step 106, the time signal is derived out of the clock signal 6a sequentially supplied to the input circuit 85 from the clock circuit 6. Then, the process advances to a next display step 107 where a display signal corresponding to the time signal is supplied to the display driving circuit 9 from the output circuit 87 to display time in the operation part of the display panel 10. Then, the process returns to the distance mode discriminating step 103.

Figure 5A:
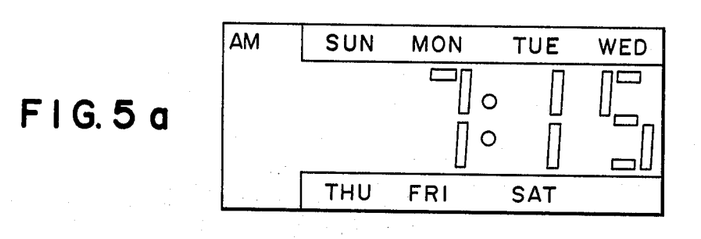
FIGS. 5a to 5g are explanatory views of each display format on the display in FIG. 1.
Figure 5B:
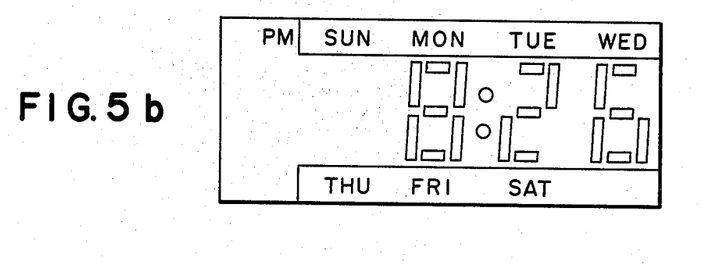

Thus, the time display on the display panel 10 is initiated by the time signal from the clock circuit 6 through the calculation process of a time display routine, which passes through the switch-on step of the key switch, the distance mode discriminating step 103, the revolution number mode discriminating step 104, the time mode discriminating step 105 and the time signal selection step 106 and returns to the distance mode discriminating step 103. The calculation process of the above time display routine is repeated so that the ever-changing time is displayed accurately on the display panel 10, until a voiced command is applied to the directional microphone 1. For example, if the time signal indicates 15 minutes after 7 a.m., the display panel 10 indicates "AM 7:15", as shown in FIG. 5a. If the time signal indicates 26 minutes past 8 p.m., the display panel indicates "PM 8:26" as shown in FIG. 5b.

Figure 5C:
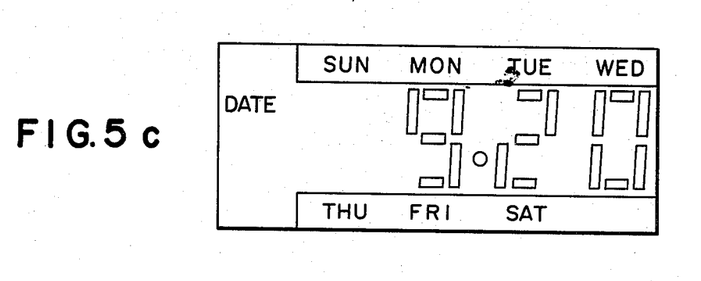
Figure 5D:
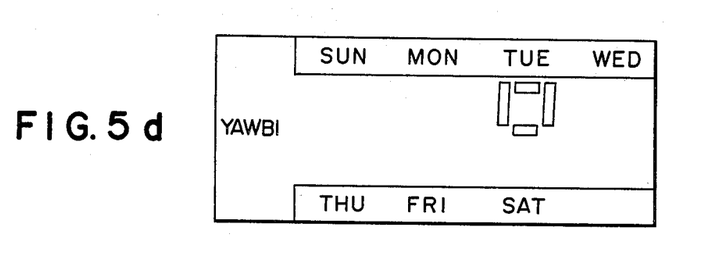
Figure 5E:
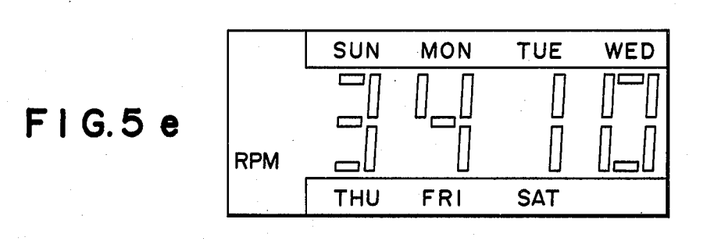
Figure 5F:
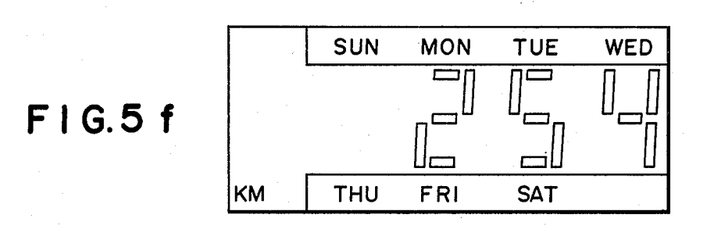

Under the condition of the above time display, if a driver applies a voiced command such as "KYO-LEE-ME-TER" or "O-DO-ME-TER" to the directional microphone 1 in order to switch to a display of drive distance, the voice signal is converted to an electric signal, which passes through the amplifier 2, the detection circuit 3 and the comparator 4. Thus, a rectangular waveform signal 4a with four rectangular waves corresponding to the number of vowels in the voice is applied to INT and EF1 terminals of the microcomputer 8. As the result, the microcomputer 8 stops its calculation process of the main routine of FIG. 3 and performs the interrupt calculation process of FIG. 4. In response to the voice pattern with four vowels a selection mode of first, second, third and fourth flags is set "1111". A detailed explanation of this calculation process will be made later. After the selection mode is set by this interrupt calculation process, the process of main routine is reset. When the process advances to the distance mode discrimination step 103 in the main routine, since the selection mode coincides with the distance mode "1111", the result of the judgement becomes "YES", and the process advances to a distance signal selection step 108. In the step 108, the distance signal 7a supplied to the input 86 from the odometer circuit 7 is selected. Then, the process goes to a display step 107, where the display signal of the distance signal 7a is applied to the display driving circuit 9 from the output circuit 87 to display a drive distance in the operation part of the display panel 10. Then, the process returns to the distance mode discriminating step 103. Therefore, in the calculation process of the distance display routine which passes through the distance mode discriminating step 103, the distance signal selection step 108, the display step 107 and returns to the step 103, the display on the display panel 10 is switched to a display of a drive distance according to the distance signal from the odometer circuit 7 after the application of the aforementioned voiced command for a display of distance. The above distance display routine is repeated and the ever-changing drive distance is displayed on the panel 10, until another voiced command is applied to the directional microphone 1. For example, if the distance signal 7a indicates 254 km, the display panel 10 displays "KM 254", as shown in FIG. 5f.

Next, when the driver applies a voiced command "TA-CHO" to the directional microphone 1 in order to switch to a display of the number of revolutions of the engine, the voice is converted to an electric signal, which passes through the amplifier 2, the detection circuit 3 and the comparator 4. As a result, a signal 4a with two rectangular waves corresponding to the number of vowels is supplied to INT and EF1 terminals of the microcomputer 8. The microcomputer 8 stops the calculation process of the main routine of FIG. 3 and performs the interrupt calculation process of FIG. 4. A selection mode of first, second, third and fourth flags is set "1100" in accordance with the voice pattern with two vowels. Then, the process returns to the process of main routine. While the result of the judgement in the distance mode discrimination step 103 of the main routine becomes "NO", the result of the number of revolutions mode discrimination step 104 becomes "YES". So, the process advances to the number of revolutions calculation step 109. In this step 109, pulses 5a, indicative of the number of revolutions which are supplied to EF2 terminal from the rotation sensor 5, are counted to obtain the number of revolutions of the engine. The process then advances to a next display step 107, where a display signal of the number of revolutions is applied to the display driving circuit 9 from the output circuit 87 to display an engine revolution number on the display panel 10. Then, the process returns to the distance mode discriminating step 103. By the application of a voiced command for the display of engine revolution number, the calculation process of the revolution number display routine which passes through the distance mode discrimination step 103, the revolution number mode discrimination step 104, the revolution number calculation step 109 and the display step 107 and returns to the distance mode discrimination step 103 switches the display of the panel 10 to a display of engine revolution number according to the revolution number pulse 5a. The above calculation process of the revolution number display routine is repeated to display the ever-changing revolution number of engine, until another voiced command is applied. In this case, when the engine revolution number indicates 3410 r.p.m., the display panel displays "RPM 3410", as shown in FIG. 5e.

Next, when the driver applies a voiced command "NAN-YAW-BEE" or "CA-LEN-DAR" to the directional microphone 1, the command is converted to an electric signal, which passes through the amplifier 2, the detection circuit 3, and the comparator 4. A rectangular waveform signal 4a with three rectangular waves corresponding to the number of vowels is supplied to INT and EF1 terminals of CPU 81 of the microcomputer 8. As a result, the microcomputer 8 stops the calculation process of the main routine and performs the interrupt calculation process of FIG. 4. A selection mode of first, second, third and fourth flags is set "1110" in accordance with the voice pattern with three vowels. Then, the calculation step of main routine is reset. As the results of the judgement in the steps 103, 104 and 105 become "NO", the process advances to a calendar day discriminating step 110. In this step 110, whether the selection mode of first, second, third and fourth flags coincides with the calendar day mode "1110" which is one of the preliminarily established standard patterns is discriminated. Since the selection mode had been set to "1110" in the interrupt calculation process routine, the result of the judgement becomes "YES" and the process advances to a calendar day signal selection step 111. In this step 111, a calendar day signal in the clock signal 6a which is sequentially supplied from the clock circuit 6 to the input circuit 85 is selected. The process advances to a four seconds display step 112 where the display signal of the calendar day signal is applied to the display driving circuit 9 from the output circuit 87 to display the calendar day on the display panel 10, as shown in FIG. 5d (display of Tuesday). The display is maintained for four seconds. Then, the process advances to the following time mode switching step 113. In this step 113, the selection mode of first, second, third and fourth flags is switched to "0000". The process returns to the distance mode discrimination step 103.

After four seconds display of the calendar day on the display panel 10, the time display routine which passes through the discrimination steps 103, 104, and 105, the time signal selection step 106 and the display step 107 and returns to the discrimination step 103 switches the display of the panel 10 to a time display in accordance with the selection mode of "0000".

Further, when the driver applies a voiced command "HI" or "DATE" to the directional microphone 1 to switch to a display of date, the voice is converted to an electric signal, which passes through the amplifier 2, the detection circuit 3, and the comparator 4. A rectangular waveform signal 4a including one rectangular wave corresponding to the position of vowels is applied to INT and EF1 terminals of CPU 81 of the microcomputer 8. As a result, the microcomputer 8 stops the main routine calculation process and performs the interrupt calculation process of FIG. 4. The selection mode of first, second, third and fourth is set "1000" in accordance with the voice pattern with one vowel. The process then returns to the main routine calculation process. Thus, results of the judgement in the discrimination steps 103, 104, 105 and 110 become NO, and the process advances to a date mode discrimination step 114. In this step 114, whether the selection mode of first, second, third and fourth flags coincides with the date mode "1000" which is one of the preliminarily established standard patterns is discriminated. Since the selection mode is set "1000" in the interrupt calculation routine, the result of the judgement becomes "YES", and the process advances to a date signal selection step 115. In this step 115, a date signal in the clock signal sequentially applied to the input circuit 85 from the clock circuit 6 is selected. The process then advances to the next four seconds display step 112, where the display signal of the date signal is applied to the display driving circuit 9 from the output circuit 87 and the date is displayed on the display panel as "DATE 9.20" (September 20th), as shown in FIG. 5c. After the display of date is maintained for four seconds, the process advance to the time mode switching step 113, where the selection mode is switched to "0000". The process then returns to the distance mode discrimination step 103. Thus, after the four seconds display of date on the display panel 10, the calculation process which passes the discrimination steps 103, 104 and 105, the time signal selection step 106 and the display step 107 and returns to the discrimination step 103 switches the display on the panel 10 to a display of time in accordance with the selection mode of "0000".

Figure 5G:
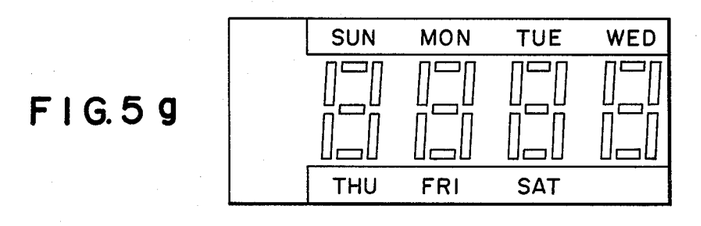

Next, when the selection mode of first, second, third and fourth flags becomes an error mode which does not coincide with any of the time mode "0000", the distance mode "1111", the revolution number mode "1100", the calendar day mode "1110", and the date mode "1000", all the results of the judgement in the discrimination steps 103, 104, 105, 110 and 114 become "NO". The process advances to an error signal formation step 116. In this step 116, an error signal for switching on and off all the displays on the display panel 10 is formed. The process then advances to the four seconds display step 112, where the display signal of the error signal is applied to the display driving circuit 9 from the output circuit 87 and all the four 7-segments display elements switches on and off, as shown in FIG. 5g. After this error display is maintained for four seconds, the process advances to the following time mode switching step 113, where the selection mode is switched to "0000". Then, the process returns to the distance mode discrimination step 103. As a result, the main routine performs the calculation process of the time display routine and switches the display of the display panel 10 to the time display.

Next, explanation will be made in detail of the interrupt calculation process in the above calculation process with reference to the flow chart of FIG. 4.

When a voiced command is applied to the directional microphone 1 and every time when a vowel contained in the voice is detected, a rectangular waveform signal 4a is applied to CPU81 of the microcomputer 8 through the amplifier 2, the detection circuit 3 and the comparator 4, whereby the interrupt calculation process starts. Namely, the first rectangular wave in the signal 4a applied to INT terminal of CPU 81 stops the main routine calculation of the microcomputer 8 temporarily. The process jumps to a voice interrupt step 201 of FIG. 4 and then advances to a reset step 202, where the first, second, third and fourth flags of the selection mode determined by the detection of the voice pattern are set to "0". The process advances to the next 0.25 second waiting step 203. In this step 203, in order to avoid an error operation due to noise, stand-by for 0.25 second is introduced from the start of interrupt. The process then advances to a vowel discrimination step 204, where the signal level at EF1 terminal is discriminated if it is turned to high level, or if a vowel is present, by the application of the rectangular waveform signal. If the result of the judgement is "NO", the process jumps to a 0.5 second waiting step 206, skipping first flag setting step 205. On the other hand, if the result of the judgement of the vowel discriminating step 204 is "YES", the process advances to the first flag setting step 205, where the first flag is set to "1", then the process advances to the following 0.5 second waiting step 206. After 0.5 second stand-by in the step 206, the process advances to a following vowel discrimination step 207.

In the vowel discrimination step 207, the signal level at EF1 terminal is detected to discriminate if another vowel is applied after 0.5 second waiting from the time of previous vowel discrimination, or if the signal level is turned to high level by the application of the rectangular wave. If the result of the judgement is "NO", the process jumps to a 0.5 second waiting step 209, skipping a second flag setting step 208. On the other hand, if the result of the judgement of the vowel discriminating step 207 is "YES", the process advances to the second flag setting step 208, where the second flag is set "1". Then, the process advances to a next 0.5 second waiting step 209. After 0.5 second waiting at the step 209, the process goes to a following vowel discrimination step 210.

In the step 210, the signal level at EF1 terminal is detected to discriminate if another vowel is applied after 0.5 second from the time of previous vowel discrimination, or if the signal level is turned to high level by the application of a rectangular wave. If the result of the judgement is "NO", the process jumps to a 0.5 second waiting step 212, skipping a third flag setting step 211. On the other hand, if the result of the judgement of the vowel discriminating step 210 is "YES", the process advances to the third flag setting step 211, where the third flag is set to "1". Then, the process advances to a 0.5 second waiting step 212. After 0.5 second waiting at the step 212, the process advances to a next vowel discrimination step 213.

In the step 213, the signal level at EF1 terminal is detected to discriminate if another vowel is applied after 0.5 second lapse from the time of a previous vowel discrimination, or if the signal level is turned to high level by the application of the rectangular wave. If the result of the judgement is "NO", the process jumps to a return step 215, skipping a fourth flag setting step 214. On the other hand, if the result of the judgement of the vowel discriminating step 213 is "YES", the process advances to the fourth flag setting step 214, where the fourth flag is set "1". Then, the process goes to the return step 215. In this return step 215, the interrupt calculation process initiated by the voiced command is finished and the calculation of main routine is reset.

Therefore, by applying a voiced command such as "HE", "TA-CHO", "NAN-YAW-BEE" and "KYO-LEE-ME-TER" to the directional microphone 1 with an interval between each vowel of the order of 0.5 second, the voice pattern of the command is detected to set a corresponding selection mode "1000", "1100", "1110" and "1111" and control the switching of display.

Since the above embodiment uses a method of detecting the timing of vowel generation with 0.5 second interval for the discrimination of the voice pattern of a voiced command applied to the directional microphone 1, if a voice with one vowel other than "HE" or "DATE" is applied, the selection mode is also set to "1000" so that after four seconds display of date on the display panel 10 the display is switched to a time display. Likewise, when a voice with two vowels with an interval of the order of 0.5 second other than "TACHO" is applied to the directional microphone 1, the selection mode is set to "1100" and number of revolutions of the engine is displayed on the display panel 10. Furthermore, the voiced commands for calendar day and distance displays can be replaced by voice with three and four vowels respectively to control switching of the display.

Although in the above embodiment a directional microphone 1 is used as a means for converting voice into an electric signal to avoid noise, a usual microphone may be also used if the voice pattern is detected with high fidelity.

The engine rotation sensor 5, the clock circuit 6 and the odometer circuit 7 as means for generating various data may be replaced by other means for the same purpose.

It may be possible to detect the voice pattern by counting the number of rectangular waveform signals 4a from the comparator 4.

Although in the above example the clock circuit 6 and the odometer circuit 7 are provided outside the microcomputer 8, it may be so arranged that the clock and the distance processing programs together with the display control program are provided inside the microcomputer 8 to which electric power is continually supplied to generate clock and distance signals in the calculation process of the software.

Instead of the display panel 10 consisting of the display operation part with classification characters and 7-segments display elements and the calendar day display part as shown above, other display means such as a Braun tube type display and a liquid crystal type display may be used.

Furthermore, instead of detecting the vowel generation timing to discriminate the voice pattern of a voiced command as shown above, other methods such as detection of the frequency spectrum through frequency analysis of voice may be used.

We claim:

1. A method for selectively displaying on a single display unit in a vehicle a value of any one of time, a plurality of calendar data and a plurality of vehicle operating condition data in response to voice commands associated with said types of data comprising the steps of:

preliminarily associating a unique signal pattern with each of said calendar data and vehicle operating condition data;

generating signals indicative of the time, each of said calendar data and each of said vehicle operating condition data;

displaying initially the time on said single display unit until any voiced command is received;

receiving a voice command by a microphone to produce voice signals corresponding to said voiced command;

matching a signal pattern of said voice signals with said unique signal pattern preliminarily associated with one of said plurality of calendar data and said plurality of vehicle operating condition data;

further displaying in place of said initial displaying step a value of one of signals generated by said signal generating step and selected by said matching step on said single display unit;

limiting the display of a value of one of said calendar data of lesser importance to a predetermined period of time to resume the display of the time thereafter; and continuing the display of a value of one of said vehicle operating condition data of greater importance than said calendar data by said further displaying step and the resumed display of the time until another voiced command is received by said receiving step.

* * * * *

UNITED STATES PATENT AND TRADEMARK OFFICE
CERTIFICATE OF CORRECTION

PATENT NO. : 4,393,271
DATED : July 12, 1983
INVENTOR(S) : Hiroshi FUJINAMI & Takashi YAMADA It is certified that error appears in the above-identified patent and that said Letters Patent is hereby corrected as shown below:

```
On the title page re Priority Data [30]

Please add: --[30]  Foreign Application Priority Data

Feb. 14, 1978  [JP]  Japan...53-16131
```

Signed and Sealed this

Twenty-fourth Day of January 1984

[SEAL]

Attest:

GERALD J. MOSSINGHOFF

*Attesting Officer*     *Commissioner of Patents and Trademarks*